(12) United States Patent
Legerton et al.

(10) Patent No.: US 8,113,653 B2
(45) Date of Patent: Feb. 14, 2012

(54) SCLERAL CONTACT LENS AND METHODS FOR MAKING AND USING THE SAME

(75) Inventors: Jerome A. Legerton, San Diego, CA (US); William E. Meyers, Scottsdale, AZ (US)

(73) Assignee: CRT Technology, Inc., Mesa, AZ (US)

( * ) Notice: Subject to any disclaimer, the term of this patent is extended or adjusted under 35 U.S.C. 154(b) by 364 days.

(21) Appl. No.: 12/428,424

(22) Filed: Apr. 22, 2009

(65) Prior Publication Data

US 2010/0271589 A1 Oct. 28, 2010

(51) Int. Cl.
*G02C 7/04* (2006.01)
(52) U.S. Cl. .................. 351/160 R; 351/160 H; 351/177
(58) Field of Classification Search .............. 351/160 R, 351/160 H, 161, 162, 177
See application file for complete search history.

(56) References Cited

U.S. PATENT DOCUMENTS

| | | | |
|---|---|---|---|
| 3,482,906 | A | 12/1969 | Volk |
| 4,194,815 | A | 3/1980 | Trombley |
| 5,493,350 | A | 2/1996 | Seidner |
| 5,929,968 | A | 7/1999 | Cotie et al. |
| 7,004,584 | B1 | 2/2006 | Meyers et al. |
| 7,040,755 | B2 | 5/2006 | Legerton et al. |
| 7,216,974 | B2 | 5/2007 | Meyers et al. |
| 7,270,412 | B2 | 9/2007 | Legerton et al. |
| 2006/0290883 | A1 | 12/2006 | Rosenthal |
| 2007/0296915 | A1 * | 12/2007 | Legerton et al. .......... 351/160 R |
| 2008/0212020 | A1 | 9/2008 | Legerton |

OTHER PUBLICATIONS

Boston Foundation for Sight web site: http://www.bostonsight.org/aboutlens.htm, "About the Boston Scleral Lens Prosthetic Device" (pp. 1-5) and "The Boston Scleral Lens and How It Works" (pp. 1-2), 2002.
Jim Schwiegerling, PhD, "Cone Dimensions in Keratoconus Using Zernike Polynomials", Optometry and Vision Science, vol. 74, No. 11, Nov. 1997.
Visante OCT User's Manual, Carl Zeiss Meditec, Inc., 2006.
Eef Van Der Worp, "Global Keratoconus Congress 2008", www.gclabsite.com, No. 47, 2007.
Greg Gemoules, O.D., "A Novel Method of Fitting Scleral Lenses Using High Resolution Optical Coherence Tomography", Eye & Contact Lens 34(2): 80-83, 2008.
Blanchard Contact Lenses, Inc., Sales and Marketing Communication materials circulated in Jan. 2009.
International Preliminary Report on Patentability dated Jun. 27, 2011 for International Application No. PCT/US2010/31619.
International Search Report and Written Opinion for International Application No. PCT/US2010/031619 dated Jun. 21, 2010.

\* cited by examiner

*Primary Examiner* — Scott J Sugarman
(74) *Attorney, Agent, or Firm* — Snell & Wilmer, L.L.P.

(57) ABSTRACT

In accordance with exemplary embodiments, the present invention provides scleral lenses comprising a central zone and at least one peripheral zone defined by an angle. In an exemplary embodiment, a peripheral zone is curved in either a concave or convex direction or is uncurved. In an exemplary embodiment, the angle for a plurality of semi-meridians or transverse sections can be varied to create a transverse undulation of a peripheral zone. In accordance with exemplary embodiments, the present invention provides scleral lenses that do not demonstrate excessive pressure on the sclera and that allow for post lens tear exchange. The present invention also provides kits of scleral lenses.

16 Claims, 12 Drawing Sheets

SCLERAL CONTACT LENS AND METHODS FOR MAKING AND USING THE SAME

FIELD OF INVENTION

The present invention relates to contact lenses, and more specifically, to contact lenses that extend beyond the diameter of the cornea, commonly referred to as scleral contact lenses.

BACKGROUND OF THE INVENTION

Soft, rigid, and hybrid bimodulus contact lenses have been manufactured and distributed in an effort to correct the naturally occurring refractive errors of the eye and the irregular refractive errors resulting from eye diseases like keratoconus and pellucid marginal degeneration, and from corneal surgery and ocular trauma.

Heretofore, soft contact lenses have been limited in their ability to correct irregular refractive errors due to the soft lens material deforming and taking the irregular shape of the underlying eye.

Rigid contact lenses have been limited in their use due to the complexity of fitting the lenses, the difficulty in reducing or eliminating the pressure of the rigid lens material on the underlying eye, and the problems relating to stagnation of the post lens tear environment.

Hybrid bimodulus contact lenses comprised of a rigid gas permeable material surrounded by a soft flexible material have solved some of the problems associated with rigid and soft contact lenses. However, lens flexure and the need to fit the lenses with a curvature that is substantially shorter in radius of curvature than the underlying eye are challenges to hybrid lens success. Further, in some cases the soft peripheral skirt of hybrid lenses fails to elevate the rigid central zone above the cornea and the resultant bearing of the rigid gas permeable material on the cornea is reported to cause discomfort and lens intolerance.

In view of the foregoing, there is an expressed need to provide lens optics with lenses that extend beyond the diameter of the cornea that do not demonstrate excessive pressure on the sclera and that allow for post lens tear exchange. There is also a need for a design and system of fitting scleral lenses that is easily understood so that the fitter can succeed in the determination of the successful lens parameters with minimal time and equipment, along with a reduced number of lens reorders, and achieve successful wearing by the patient.

Moreover, because of the uncurving nature of the sclera near the limbus, often neither a concave downward curve nor an uncurved landing zone can contact the sclera at just inside the lens edge to accomplish appropriate edge lift without impinging on the more peripheral sclera to the point of penetration. In response, such landing zone curves may cause the entire lens to be supported further above the cornea and contact the sclera with a very narrow support zone.

The present invention addresses these needs and other limitations of the prior art.

SUMMARY OF THE INVENTION

In accordance with exemplary embodiments, the present invention provides scleral lenses comprising a central zone and at least one peripheral zone defined by an angle. In an exemplary embodiment, a peripheral zone is curved in either a concave or convex direction or is uncurved. In an exemplary embodiment, the angle for a plurality of semi-meridians or transverse sections can be varied to create a transverse undulation of a peripheral zone. In accordance with exemplary embodiments, the present invention provides scleral lenses that do not demonstrate excessive pressure on the sclera and that allow for post lens tear exchange.

In accordance with exemplary embodiments, the present invention provides scleral lenses comprising a central zone and at least one peripheral zone defined by an angle, wherein a peripheral zone is curved convex toward the eye.

In various embodiments, the present invention also provides kits of scleral lenses so that the fitter can succeed in the determination of the successful lens parameters with minimal time and equipment, along with a reduced number of lens reorders, and achieve successful wearing by the patient.

BRIEF DESCRIPTION OF THE DRAWINGS

The exemplary embodiments of the present invention will be described in conjunction with the appended drawing figures in which like numerals denote like elements and.

DETAILED DESCRIPTION

The present invention relates to contact lenses that extend beyond the diameter of the cornea, commonly referred to as scleral contact lenses. One skilled in the art will appreciate that various aspects of the invention may be realized by any number of materials or methods configured to perform the intended functions. For example, other materials or methods may be incorporated herein to perform the intended functions. It should also be noted that the drawings herein are not all drawn to scale, but may be exaggerated to illustrate various aspects of the invention, and in that regard, the drawings should not be limiting.

Scleral lenses in accordance with the present invention may be made of any suitable contact lens material and may be configured as soft lenses and hybrid bimodulus lenses as well as rigid lenses. In accordance with exemplary embodiments, the lens is comprised of one or more of fluorosilicon acrylate, silicon acrylate, polymethylmethacrylate, a silicon hydrogel, or another suitable material. In general, any gas permeable, biocompatible material is suitable for use herein.

An exemplary lens may be used with humans or animals. In exemplary embodiments, the lens has a diameter larger than the visible iris diameter. In exemplary embodiments, the diameter of the lens is between about 8 mm and about 28 mm, and generally the diameter of the lens is between about 10 mm and about 22 mm. One skilled in the art will appreciate that a lens diameter according to the present invention may be much larger or smaller, depending on the intended purpose, the shape and size of the eye, and the portion of the sclera to be fitted with the lens.

A lens in accordance with the present invention may have any suitable cross-sectional thickness and the cross-sectional thickness may vary across the surface of the lens. In exemplary embodiments, the cross-sectional thickness ranges from about 0.05 to about 1.0 mm. One skilled in the art will appreciate that a lens cross-sectional thickness according to the present invention may be much thinner or thicker.

An exemplary lens may be materially and/or structurally configured for daytime use only, nighttime use only, or 24 hour use for a single day or a plurality of days.

Figure 1:
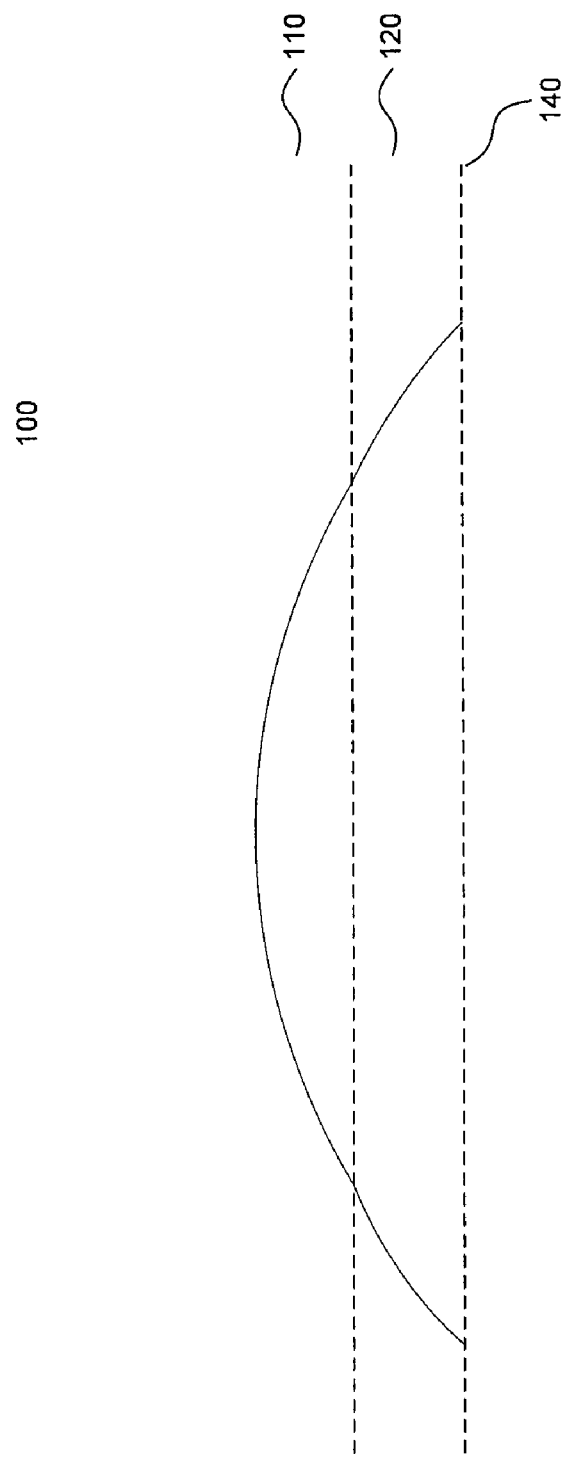
FIG. 1 illustrates the zones of a scleral contact lens in accordance with an exemplary embodiment of the present invention.

In general, and as shown in FIG. 1, an exemplary lens 100 in accordance with the present invention comprises a central zone 110, at least one peripheral zone 120, and an edge contour zone 140. Lens 100 in accordance with the present invention further comprises an anterior surface and a posterior surface. "Anterior surface" refers to the surface meant to contact the eyelid while "posterior surface" refers to the surface meant to contact the eye. Unless otherwise indicated, the description as to configurations and geometries refers to the posterior surface of lens 100.

Central Zone

In accordance with exemplary embodiments, the central zone is generally concentric with and comprises the center of the lens. In exemplary embodiments, the central zone is configured to have a conventional spherical geometry and has a diameter comparable to the visible iris diameter, for example, from about 4 mm to about 18 mm, and generally, from about 4 mm to about 12 mm. In various exemplary embodiments, the central zone may alternatively be aspherical, toric, multifocal or rotationally non-symmetrical.

In various exemplary embodiments, the central zone has a posterior surface having a curvature determined by the correction or reshaping to be imparted to the cornea or based upon other desirable properties and/or effects. For example, an exemplary lens comprises a central zone configured to correct an irregular refractive error resulting from eye diseases like keratoconus and pellucid marginal degeneration, and from corneal surgery and ocular trauma. The radius of curvature of the central zone may be chosen based upon characteristics of an eye for which the lens is being designed, and particularly related to the amount of correction required. In various exemplary embodiments, the central zone may have a radius of curvature longer or shorter than the radius of curvature of the cornea. In exemplary embodiments, the central zone is configured independent from the peripheral zone(s).

Peripheral Zones

A study of biometric data of eyes measured with optical coherence tomography (Visante OCT) and infra-red Scheimpflug imaging instrumentation (Oculus Pentacam) has provided the inventors with useful information to better understand the geometry and dimensions of human eyes.

The inventors utilized a database of eyes to determine the mean sagittal depth of eyes and the standard deviation at chord diameters of 10.5 mm and 13 mm. An angle measurement was made from a point on a semi-chord of 5.25 mm that was axially 80 microns anterior to the cornea to a point on the eye at a semi-chord of 6.5 mm. In addition, the curvature of the sclera was measured. The resultant curvature measurement demonstrated that the local radius of curvature could not be best described as being co-axial with the radius of curvature of the cornea. Further, the measured radius of curvature of the sclera was not uniform circumferentially and it varied from one eye to the next.

A study of these data by the inventors revealed the need to control the angle of at least one peripheral zone with regard to the next most central zone, whether the peripheral zone was to be curved or uncurved.

Thus, in exemplary embodiments, the central zone is surrounded by at least one peripheral zone defined by an angle. In accordance with exemplary embodiments, a peripheral zone is generally concentric with the central zone. In some embodiments, a peripheral zone is a generally annular or ring-shaped portion of the lens, overlying the cornea and/or sclera and found beyond the central zone. In some embodiments, a peripheral zone has a constant width circumferentially, for example, from about 0.1 mm to about 10 mm. In other embodiments, a peripheral zone has a variable width circumferentially.

Figure 2:
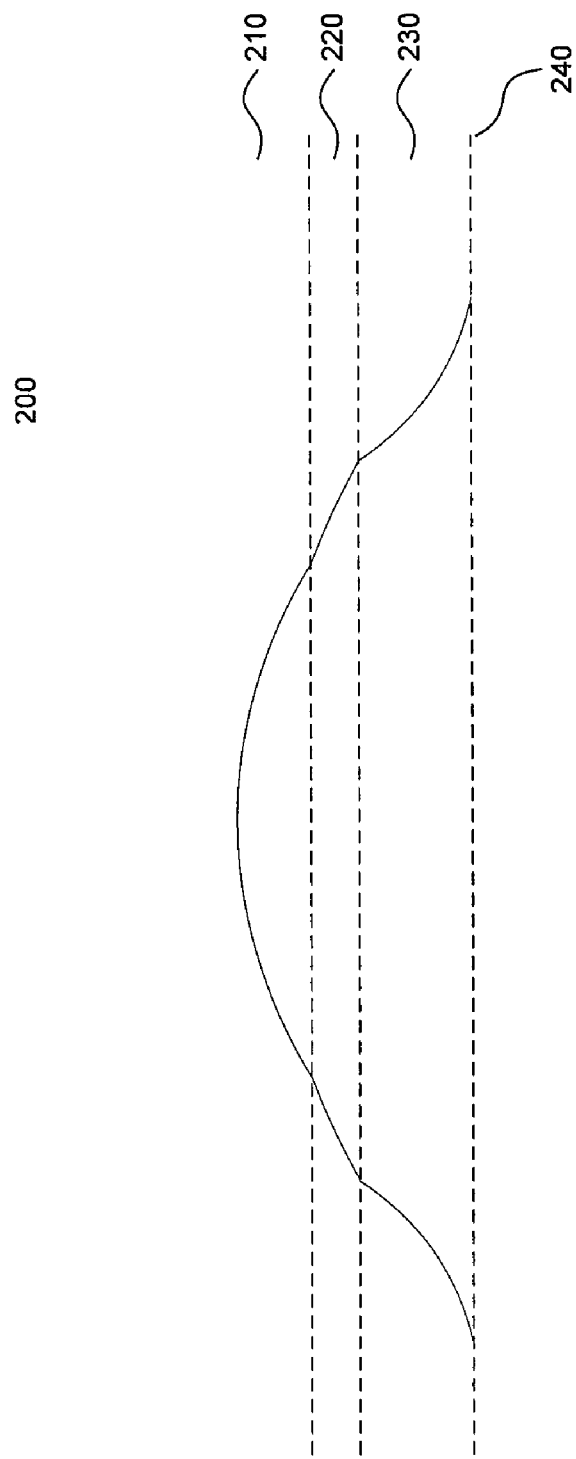
FIG. 2 illustrates a scleral contact lens comprising two peripheral zones in accordance with an exemplary embodiment of the present invention.

In exemplary embodiments, the central zone is surrounded by a plurality of peripheral zones (for example, 2, 3, 4, 5, 6, 7, 8, etc), each defined by an angle. For example, and as shown in FIG. 2, an exemplary lens 200 in accordance with the present invention comprises a central zone 210, a first peripheral zone 220, a second peripheral zone 230, and an edge contour zone 240.

In exemplary embodiments, an angle defining a peripheral zone is measured at a hinge point at the junction of a next most central zone and the peripheral zone. In exemplary embodiments, a hinge point will be located anterior to, or rest upon the surface of the eye surface. In exemplary embodiments, a hinge point will be located anterior to, or rest upon the surface of the peripheral-corneal zone. Stated differently, in accordance with exemplary embodiments, a peripheral zone is configured to not vault the peripheral-corneal zone.

Figure 3:
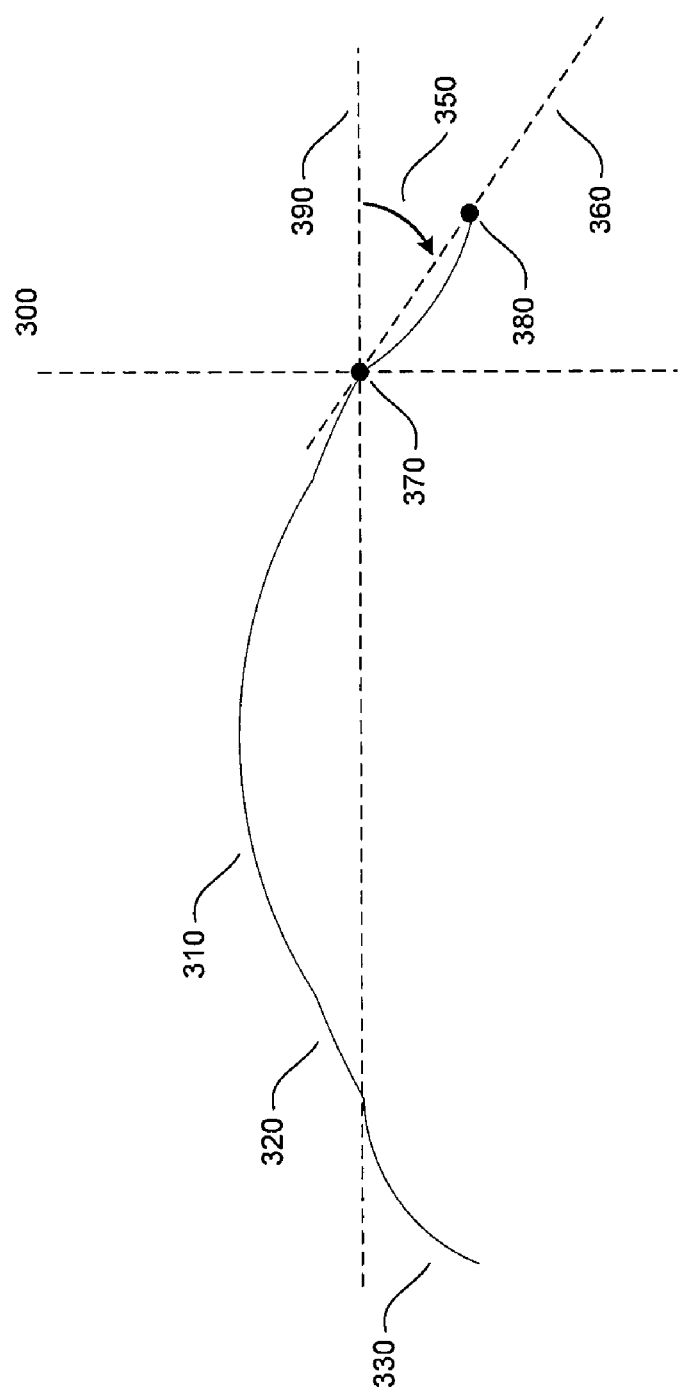
FIG. 3 illustrates a peripheral zone defined by an angle in accordance with an exemplary embodiment of the present invention.

In an exemplary embodiment, illustrated in FIG. 3, a scleral contact lens 300 has a posterior surface comprising a central zone 310 and at least one peripheral zone, wherein: a peripheral zone 330 is defined by an angle 350; the angle 350 is formed by an intersection of a line 360 and a cross-dimensional chord 390; the line 360 connects a hinge point 370 at the junction of a next most central zone 320 and the peripheral zone 330, and a most peripheral point 380 of the peripheral zone 330, the hinge point 370 and the most peripheral point 380 both being located on a semi-meridian of the contact lens 300; and the cross-dimensional chord 390 passes through the hinge point 370. As used herein, a cross-dimensional chord is perpendicular to the central axis of an exemplary scleral lens.

One skilled in the art will appreciate that while an angle defining a peripheral zone may be measured at a hinge point, the angle may be measured at any number of points. For instance, in an embodiment, a peripheral zone is defined by one or a plurality of conics, for example, having an apex coincident with the central axis of, or otherwise anterior or posterior to, an exemplary scleral lens. In another embodiment, the use of a convex curve conforms to an angle wherein the extended radius of curvature intersects the axis of the central zone of the lens.

In an exemplary embodiment, a peripheral zone defined by an angle is curved in either a concave or convex direction or is uncurved. In the event a peripheral zone is curved, its radius of curvature, conic constant and/or polynomial expression may be specified along with the angle of the chord of its arc.

In exemplary embodiments, wherein a peripheral zone defined by an angle is curved, its radius of curvature may be from about negative 50 mm to about positive 50 mm. Of course, one skilled in the art will appreciate that the radius of curvature may be infinitely greater as the curve approaches a straight line (flat).

The biometric data from 90 right eyes and 43 left eyes of subjects measured with optical coherence tomography were analyzed by the inventors to determine the mean sagittal height of the eye at various semi-chords from the visual axis of the eye. These data were plotted to determine the mean shape of the eye over a chord diameter of greater than 15.0 mm and the standard deviation at each measured semi-chord. While not wishing to be bound by theory, the analysis demonstrated that the mean eye may demonstrate a shape that requires a curved surface that is convex toward the eye. This conclusion would represent a discovery by the inventors that is contrary to the historical and conventional understanding and practice of lens design where the zones of lenses that extend beyond the limbus of the eye are concave toward the eye.

Thus, in exemplary embodiments, a peripheral zone comprises a curvature that is convex toward the eye in one or more regions of at least one peripheral zone of the lens that covers a portion of the scleral conjunctiva of the eye.

In an exemplary embodiment, a peripheral zone defined by an angle is further defined by a sigmoid, conic constant and/or polynomial expression. In an exemplary embodiment, a peripheral zone serves as a connecting zone to adjust the sagittal depth to a desired amount such that the lens can substantially touch the cornea, lightly touch the cornea under the central zone or can be suspended a desired amount above the cornea. The connecting zone depth is determined to bring the lens within an intended proximity to the cornea.

In the event the portion of the eye underlying the peripheral zone defined by an angle is not circumferentially uniform in elevation, the angle for a plurality of semi-meridians or transverse sections can be varied to create a transverse undulation of a peripheral zone to allow the peripheral zone of the lens to have an equivalent lens eye relationship. For similar reasons, alternatively, or additionally, the curve for a plurality of semi-meridians or transverse sections can be varied, as shown, for example, in FIG. 3, wherein peripheral zone 330 is convex toward the surface of the eye in a semi-meridian and concave toward the surface of the eye in the alternate semi-meridian.

The rotational transition between semi-meridians or transverse sections having differing angles and/or curves may be linear or otherwise uncurved, or defined by a sigmoid, conic constant or other polynomial expression. Moreover, the rotational transition between semi-meridians or transverse sections having differing angles and/or curves may vary radially.

In accordance with exemplary embodiments, the most peripheral zone may be comprised of meridians modified by any mathematical means of smoothly diminishing the difference between the edge sagittal depth location at full diameter that would derive by continuation of the curvature of a given meridian passing through the most peripheral zone to the full diameter of the edge in comparison to the edge that would be projected from one selected meridian whose edge sagittal depth location has been chosen to be the common edge.

In exemplary embodiments, the meridian(s) projecting to the common edge are those yielding the least ultimate sagittal depth at the full edge diameter but may in some cases be chosen by other criteria. Such methods of diminishing the difference may be as simple as projecting the difference that would arise in the absence of reconciliation and using a stepwise linear function to gradually eliminate the projected difference over the course of transitioning from the most outer diameter of peripheral zone to a point at or near the full edge diameter where all meridians coincide in sagittal depth to generate a common edge for the lens. Any mathematical means however would suffice and may additionally incorporate terms designed to minimize sharp junctions or to modify the rate of diminishment to control where along the course of transition the most rapid diminishment occurs. Such functions may include polynomials, power series, logarithmic functions or averaging functions among others. Such functions may be applied to each defined meridian as required by the difference of the projected sagittal depth at full diameter for that meridian from the sagittal depth at full diameter of the meridian selected to define the common edge.

Edge Contour Zone

As noted above, an exemplary lens in accordance with the present invention comprises a central zone, at least one peripheral zone, and an edge contour zone. In exemplary embodiments, the edge contour zone provides an edge lift at the termination of the lens that allows the aqueous tear film to freely pass under the lens and exchange the post lens film.

In exemplary embodiments, a peripheral zone is curved in either a concave or convex direction or is uncurved in an effort to produce a light and uniform conjunctival pressure with a lens edge termination that is lifted above the conjunctiva.

Figure 4A:
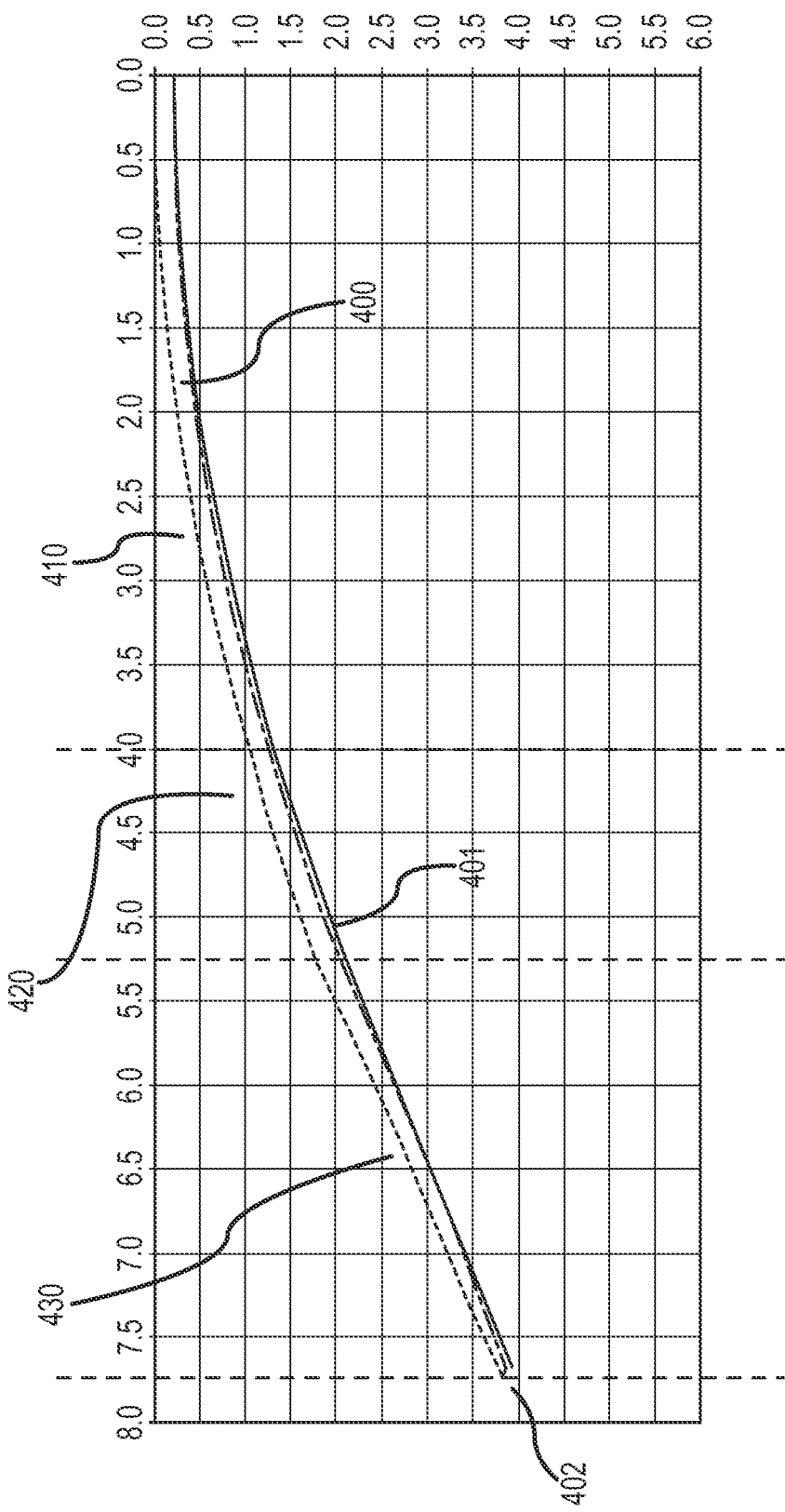
FIG. 4A illustrates a half lens in cross section in accordance with an exemplary embodiment of the present invention.
Figure 4B:
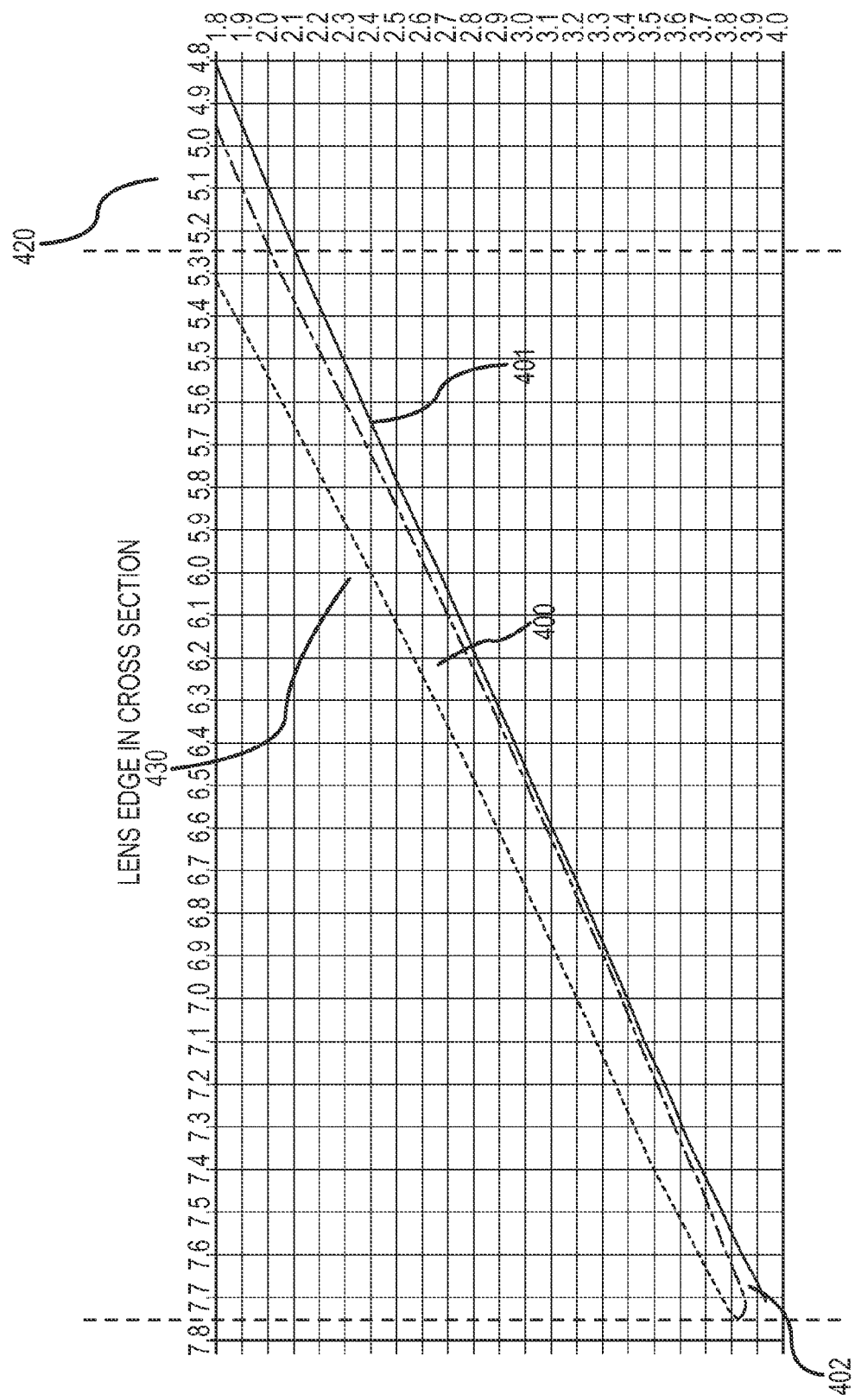
FIG. 4B illustrates a close up of the edge contour zone of the lens in FIG. 4A.

For example, as shown in FIGS. 4A and 4B (FIG. 4B merely illustrates a close up of the edge contour zone of the lens in FIG. 4A), a lens 400, configured to at least partially rest upon a typical eye surface 401, comprises (i) a central zone 410 having a semi-chord length of approximately 4.0 mm, (ii) a first peripheral zone 420 having a width of approximately 1.25 mm, and (iii) a second peripheral zone 430 having a width of approximately 2.5 mm. The first peripheral zone has a longer radius of curvature than the central zone and the second peripheral zone is convex toward the eye to provide an edge lift 402 at the edge contour zone.

In accordance with exemplary embodiments, notwithstanding the curvature changes in the peripheral zone(s), the lens returns to at least one of circular, planar, and untilted at its edge contour zone. Such return may thereby reduce conjunctival pressure and/or conjunctival epithelial flap occurrence, as well as provide benefits such as improved circulation and exchange of the post lens tear film, and improved regulation of the edge lift circumferentially.

Examples and Methods for Making

Having described the individual components of scleral lenses in accordance with various embodiments of the present invention, exemplary embodiments will now be provided, along with methods for making exemplary scleral lenses.

With reference to FIGS. 5A-5G, a typical eye surface 501 is illustrated, a continuation of the apical curvature of the central cornea 503 is illustrated, 504 denotes an exemplary scleral lens, 505 denotes the posterior curve of lens 504, and 506 denotes the anterior curve of lens 504.

In exemplary embodiments, a central geometry of an eye may be found to be toric in an amount equal to a refractive astigmatism, and in such case the central zone of an exemplary scleral lens is selected to be substantially spherical.

Figure 5A:
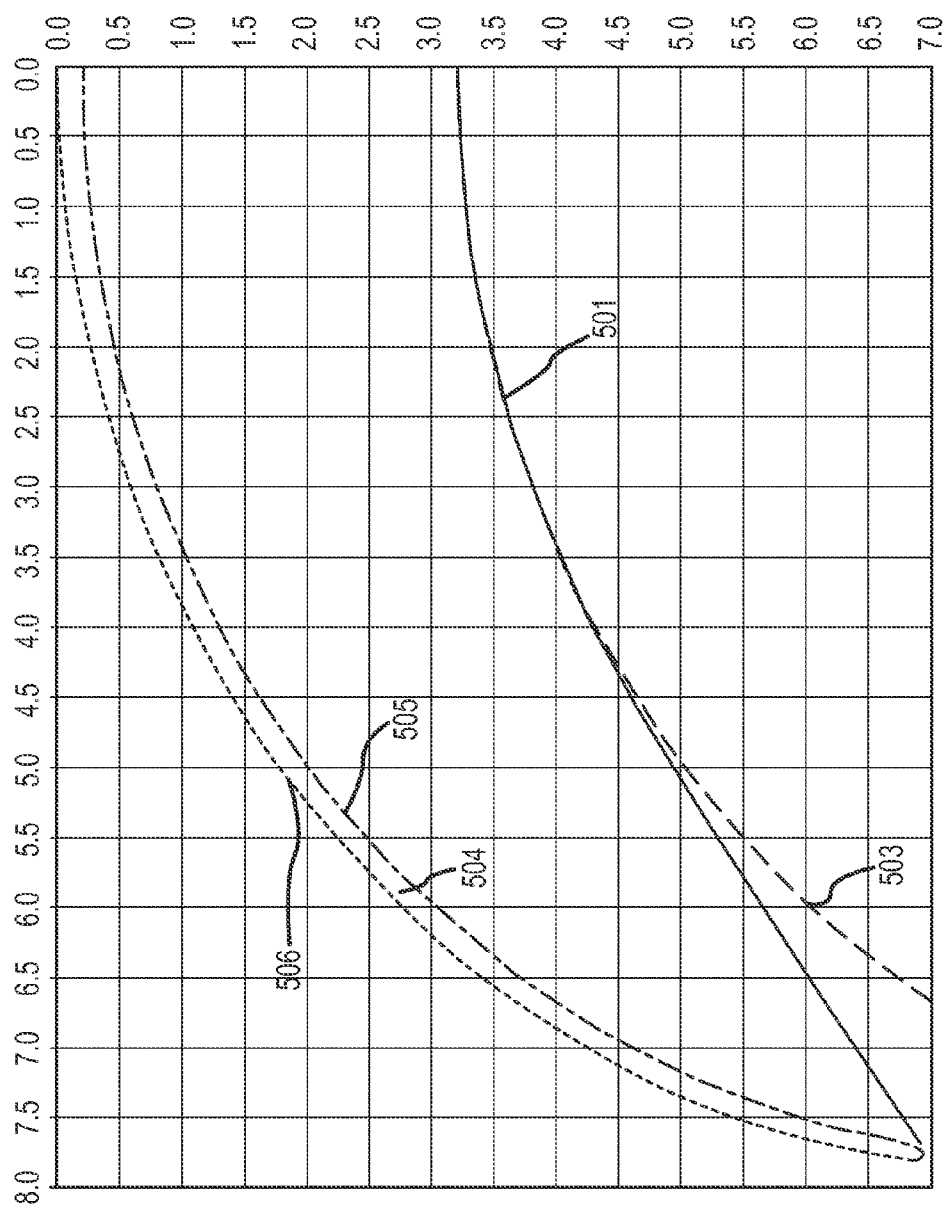
FIGS. 5A-5G illustrate an exemplary application of the invention to create a scleral lens.
Figure 5B:
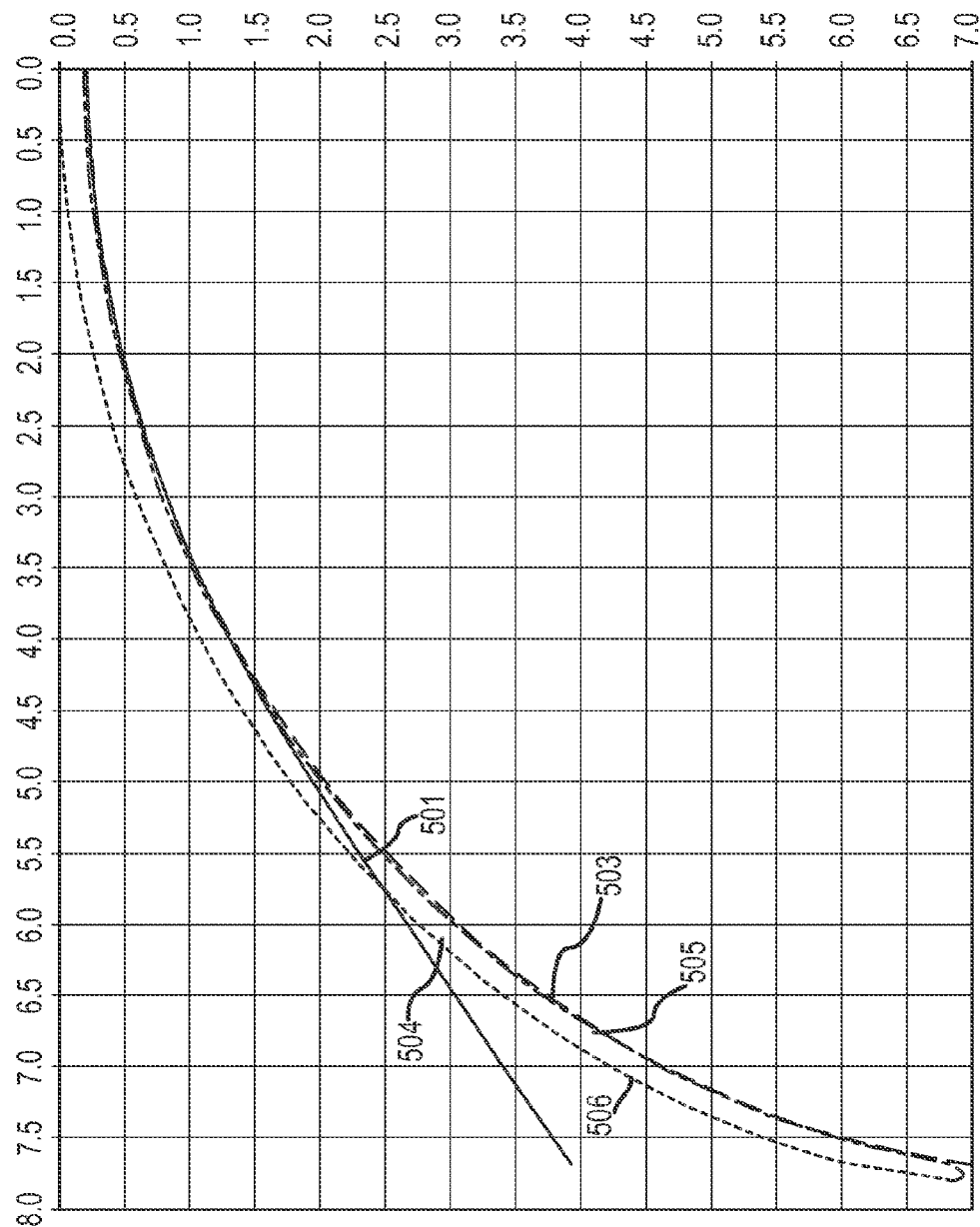
Figure 5C:
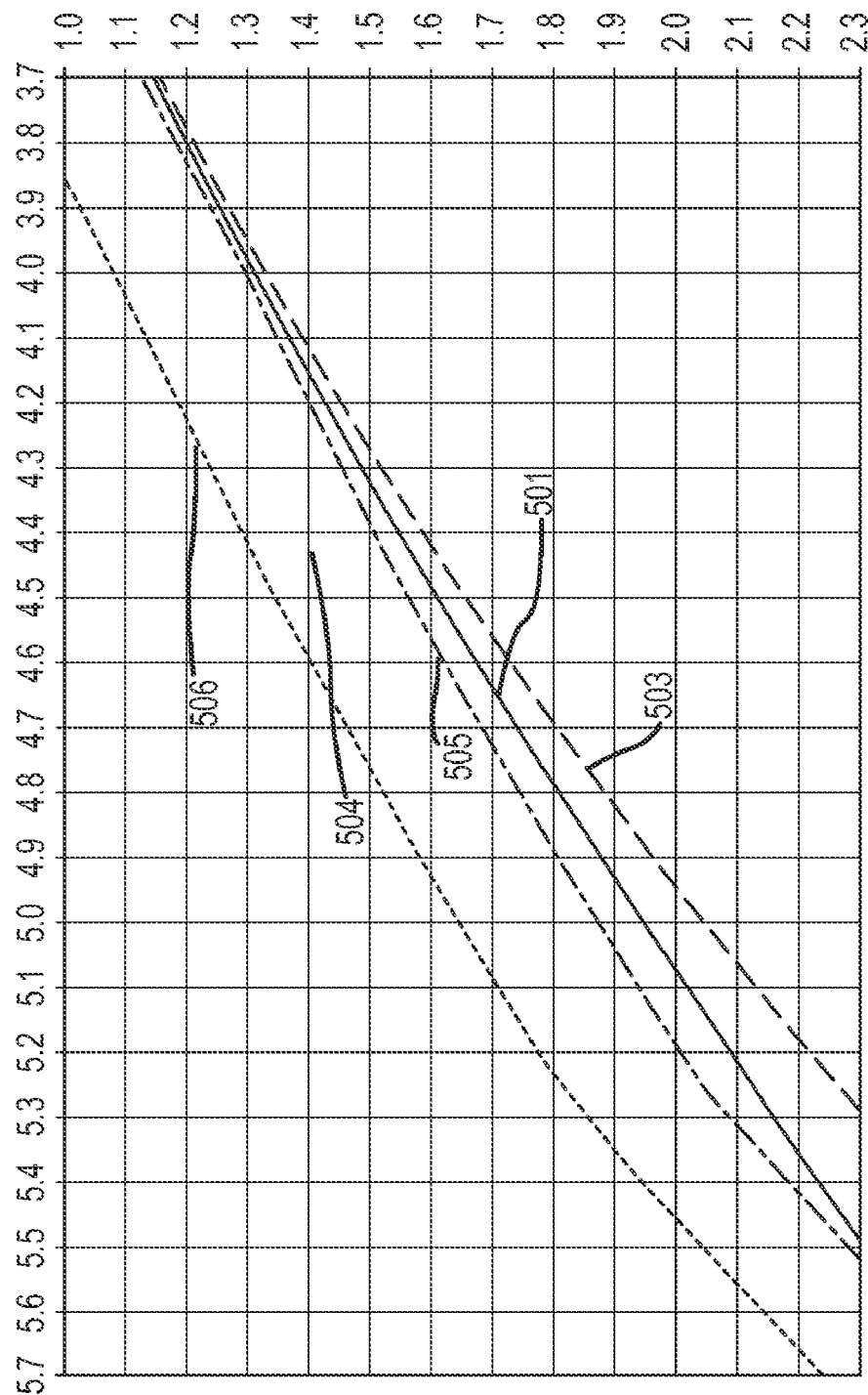

In exemplary embodiments, the apical radius of the cornea to be fit with a lens of the present invention is measured and a central zone curve is chosen near the value of the apical radius. Because of the flattening of the cornea, in some embodiments this radius cannot be used for the entire back radius, as seen in FIG. 5A. Rather, in such embodiments it may be preferable or even necessary to have a vault over the central cornea to accommodate the same. That being said, in some embodiments it is considered unacceptable to have a central void of greater than 80 microns due to bubble formation and entrapment. In such embodiments, and to resolve the excess vaulting, a slightly flatter central zone curve is chosen such that a minimal void can be maintained throughout the optical zone. An exemplary selection is seen in FIG. 5B and the flatter curve's clearance at 4 mm semi-chord is seen in FIG. 5C. A central clearance is maintained throughout the optical zone (e.g., from about 0.001 mm to about 0.1 mm, from about 0.01 mm to about 0.03 mm, or about 0.015 mm).

In some embodiments it may not be possible to maintain the central zone curvature beyond the chosen optical zone diameter without at least partially contacting the cornea. Accordingly, in such embodiments, a connecting zone curve is initiated (spherical, angled spherical curve, aspheric curve, conic section, polynomial, etc.) to bring the lens to a point above the cornea axially (e.g., from about 0.001 mm to about 0.15 mm, from about 0.01 mm to about 0.1 mm, or about 0.08 mm) at a radius very near the limbus. This is shown in FIG. 5C from the 4 mm semi-chord to the 5.25 mm semi-chord, the spherical connecting zone curve in this particular embodiment selected to be flatter than the chosen central zone curve.

Figure 5D:
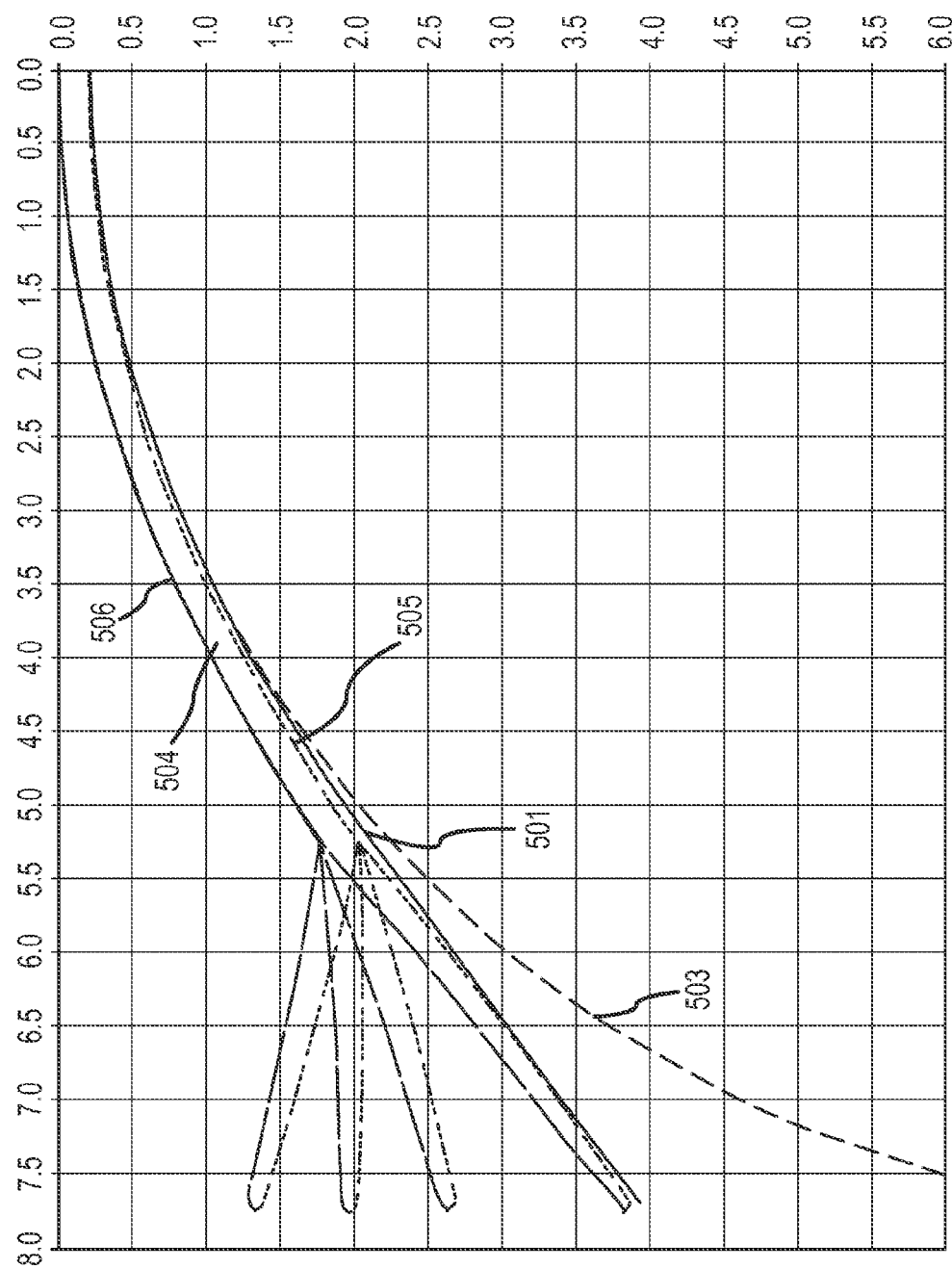
Figure 5E:
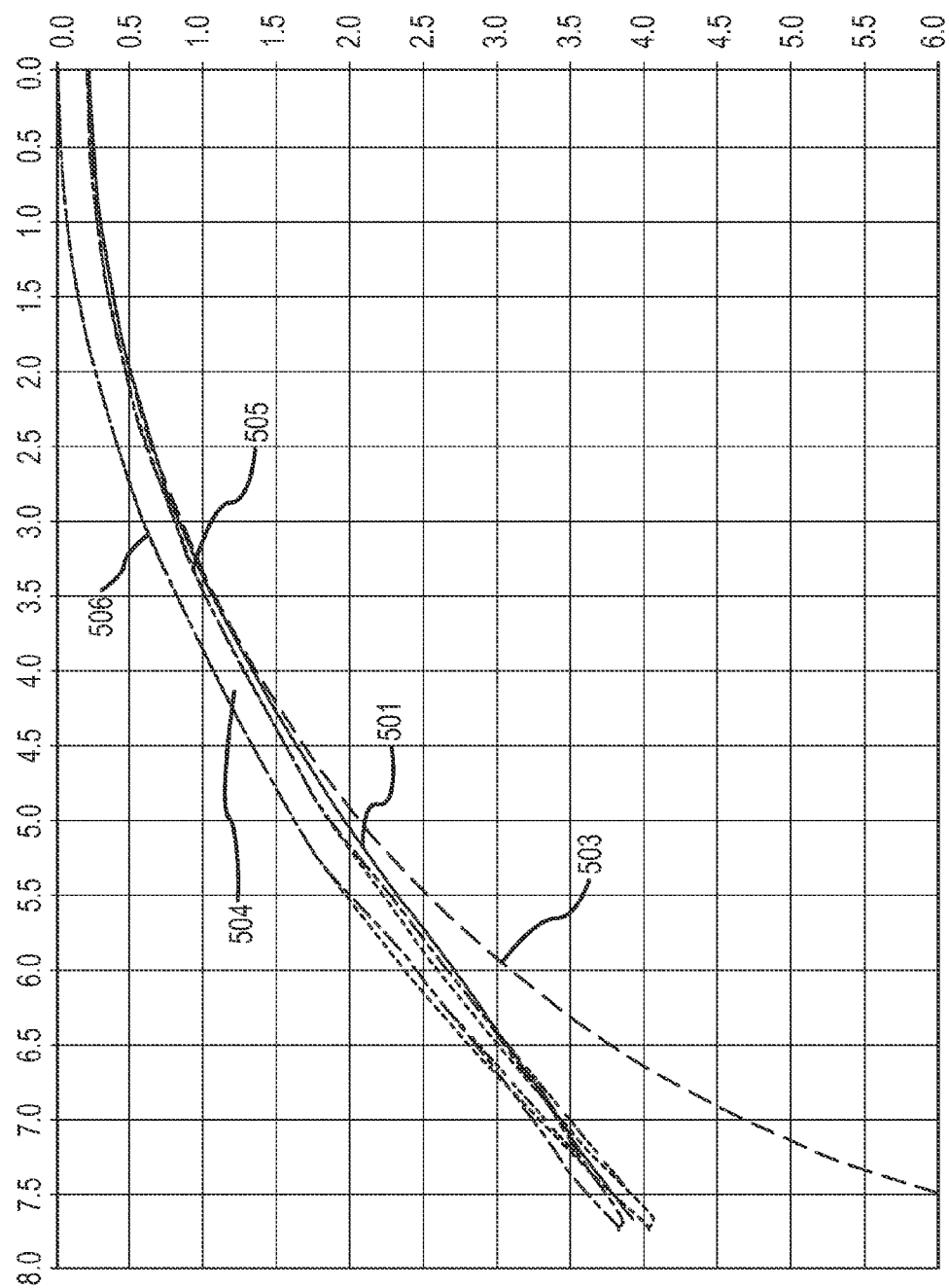

In this embodiment, from this point (at a radius very near the limbus), it is clear in exemplary sclera there is little if any curvature in that region, and in some embodiments, a very flat landing zone curve will be needed to contact the sclera in a manner which provides a broad zone of support for the lens, yet offers necessary edge lift to maintain fluid flow and lens movement. However, in some embodiments, flat landing zone curves with their origin on the lens central axis will generally begin to depart too quickly from the sclera and at a wide angle. Once a trial landing zone curvature is chosen however, it may be brought into alignment with the sclera by the use of an angular adjustment as seen in FIG. 5D. In this regard, the original landing zone curve chosen is rotated about its hinge point at (5.25 mm semi-chord in FIG. 5D) to achieve contact just inside the lens edge (13.5 mm diameter for the 15.5 mm lens in FIG. 5D). In some embodiments, the flatness of the chosen landing zone curve is selected to assure adequate room for tangential contact and yet yield edge lift near from about 0.001 mm to about 0.25 mm, from about 0.01 mm to about 0.15 mm, or about 0.08 mm, at the lens edge.

Figure 5F:
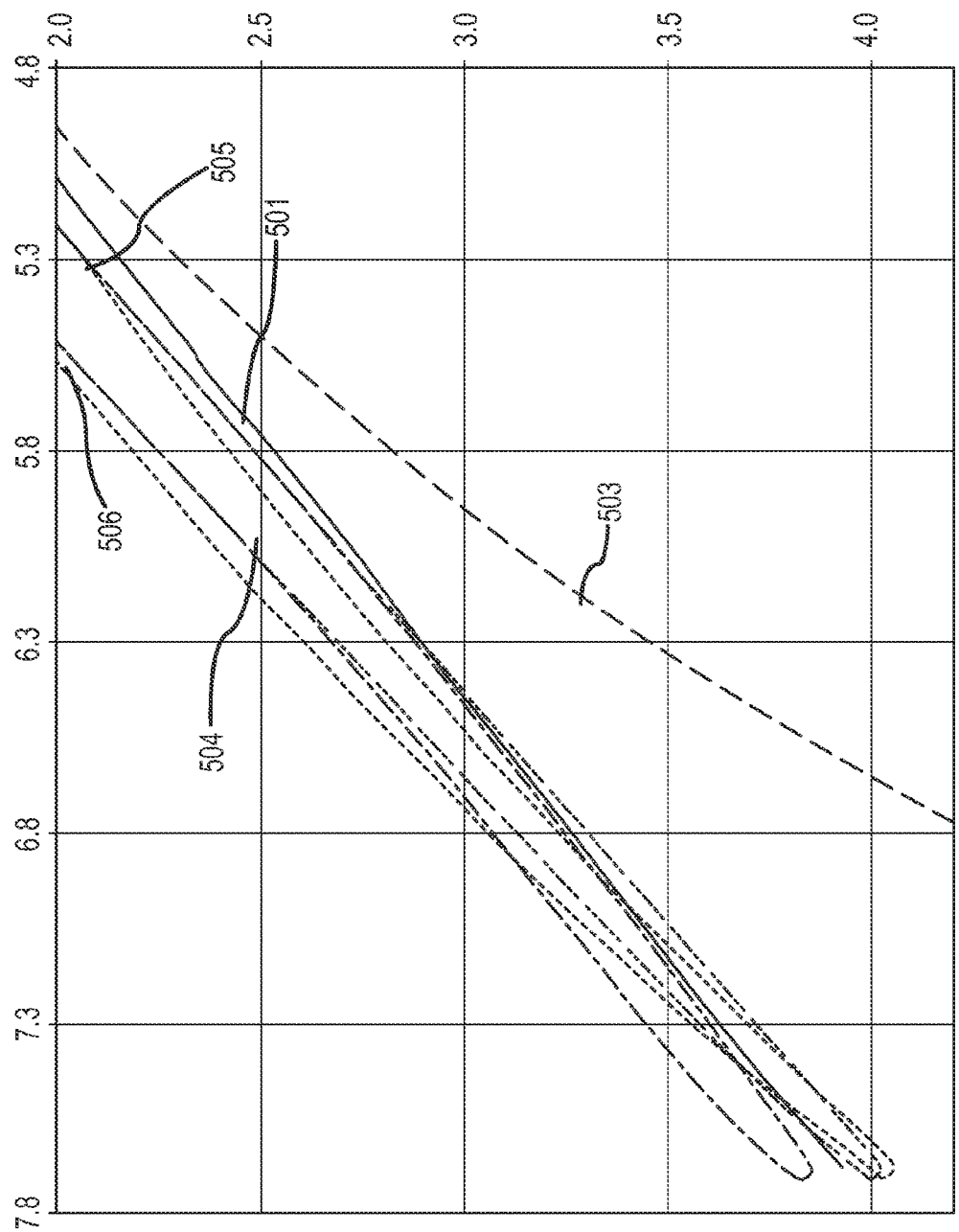
Figure 5G:
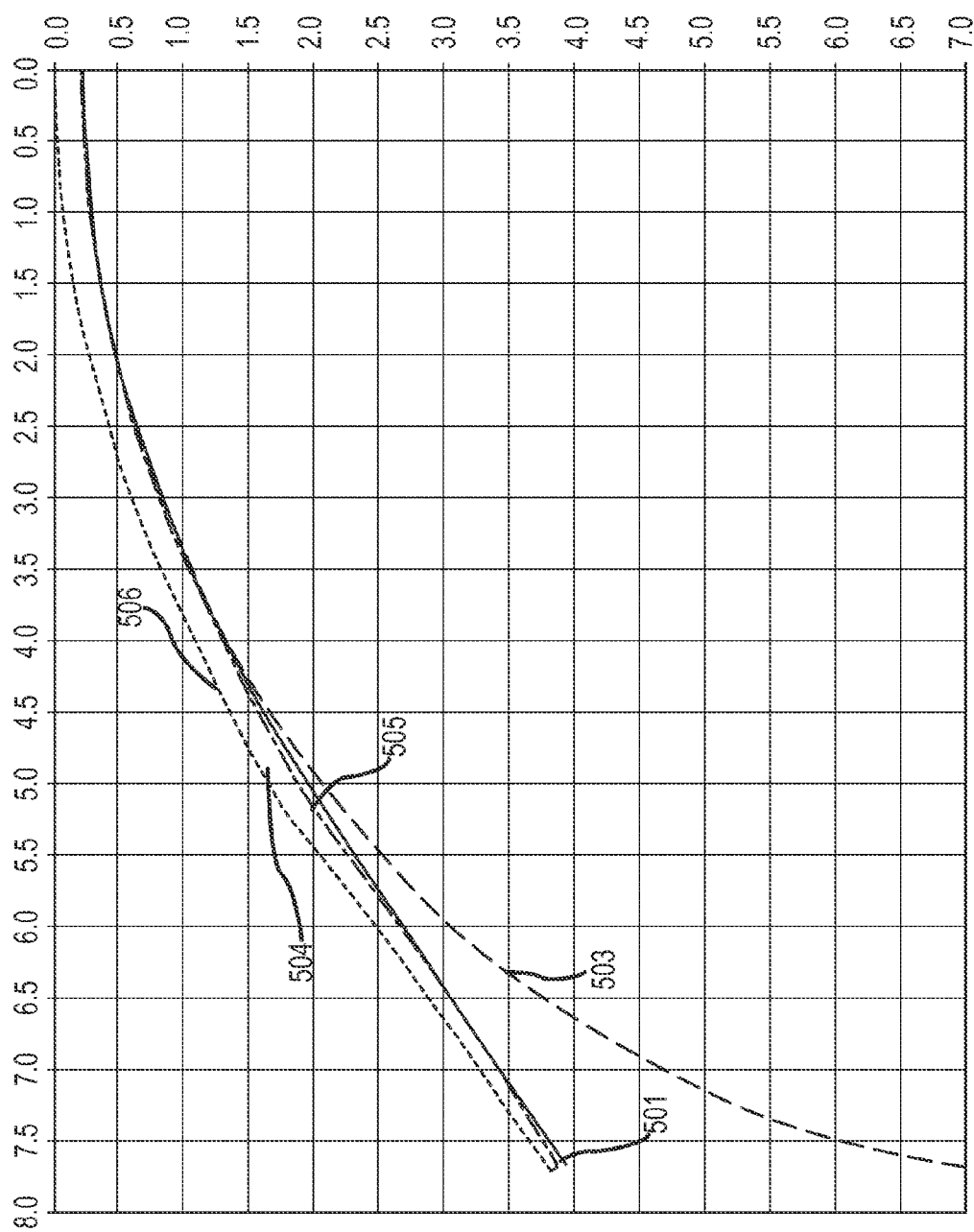

Because of the uncurving nature of the sclera near the limbus, in some embodiments, no landing zone curve concave toward the sclera can accomplish appropriate edge lift at the lens edge. See FIG. 5E and a blow-up of the contact region in FIG. 5F, illustrating neither a 15 mm concave downward curve nor an uncurved landing zone can contact the sclera at just inside the lens edge without impinging on the more peripheral sclera to the point of penetration. In response, such landing zone curves may cause the entire lens to be supported further above the cornea and contact the sclera with a very narrow support zone. This may be resolved in some embodiments by employing a convex (toward the eye) landing zone curve. In the present example, a 25 mm radius with an origin anterior to the lens apex and angled downward 52.5 degrees at its hinge point at 5.25 mm semi-chord measured from vertical yields the preferred 0.080 mm edge lift seen in FIG. 5G. One skilled in the art will appreciate that this angle could be as great as 120 degrees if the convex curve is smaller than the 25 mm used in this example. It could be as small as 1 or 2 degrees or be even negative in the case of a very highly curved sclera requiring a concave down peripheral curve needing to be rotated clockwise instead of the typical counterclockwise around the hinge point.

In exemplary embodiments, an angled landing zone can be used where the radius of curvature of the sclera (R) is determined by striking a chord (2r) on the image of the sclera and measuring the sagittal height of the arc of the sclera (s) above the chord and using the formula: $R=r^2/2s(r)$. In this manner, the radius of curvature of the angled landing zone is determined.

The radius of curvature of the sclera may be determined by other biometric means. An angled curve is used to accommodate for the fact that the center of curvature of the sclera and the center of curvature of the cornea are not coincident; rather, while not wishing to be bound by theory, the center of curvature of the sclera is posterior to the center of curvature of the cornea. It is also known to those skilled in the art that there is geometric diversity with regard to the merging of the sclera with the cornea. Some eyes will appear to have a smooth transition while other eyes demonstrate a corneal-scleral junction where there is a hinge point having a visible change in curvature. In the later group, a curved zone that is controlled by an angle at a hinge point is preferred to best fit the scleral zone of the lens as compared to a conventional co-axial curved zone lens design.

The method of applying the invention can include the use of corneal topography elevation data along with measurements of images taken by optical coherence tomography, Scheimpflug imaging, or other biometric instrumentation wherein the central corneal geometry is used to select a central zone curvature and the sagittal height of an eye is measured at a chord diameter for a targeted tangential touch on the sclera and an angle is measured from a prescribed location in front of the anterior cornea at a prescribed chord diameter.

Kits for Using

That being said, corneal topographers and optical coherence tomographers are not found in the majority of offices where contact lenses are prescribed. In that regard, it is useful for the application of the present invention to provide a system and kit of lenses to assist the eye care practitioner in fitting the lenses when biometric instrumentation is not available.

The present invention teaches the use of a kit wherein a series of lenses are provided each having a plurality of zones. In an exemplary embodiment, the present invention teaches the use of a kit wherein a series of lenses are provided each having three zones. In such an embodiment, the central zone may be spherical, aspherical, toric, multifocal or rotationally non-symmetrical with a pre-determined chord diameter and is surrounded by a first peripheral zone (i.e., connecting zone) that is designed to control the sagittal depth of the lens at its junction with a second peripheral zone (i.e., landing zone) which is defined by an angle.

In exemplary embodiments, the kit includes a series of lenses having varying central zones, each with a series of first peripheral zones. Lenses with a central zone and a series of first peripheral zone sagittal depths have a series of second peripheral zone angles.

In exemplary embodiments, the second peripheral zone defined by an angle may in turn be curved or uncurved. When the second peripheral zone is curved, it may be curved in a manner that is convex to the anterior eye or concave to the anterior eye.

The configuration of a kit of lenses in accordance with an exemplary embodiment is as follows:

| | |
|---|---|
| Over-All Diameter | 15.5 mm |
| Central Zone Diameter | 8.0 mm |
| Connecting Zone (i.e., First Peripheral Zone) Width | 1.25 mm |
| Landing Zone (i.e., Second Peripheral Zone) Width | 2.5 mm |
| Central Zone Radii | 6.60 to 8.60 mm in 0.4 mm steps |
| Connecting Zone Depths | 0.525 to 0.875 mm in 0.050 steps |
| Landing Zone Angles | 120 degrees counterclockwise, as seen in the figure, to 20 degrees clockwise in 1 degree steps |
| Landing Zone Radius of Curvature | Negative 25 mm |

The eye care practitioner may be guided to the selection of the suggested lens by way of central corneal curvature measurements with standard keratometry and by way of the measured horizontal corneal diameter. These measurements have a predictive value with regard to the relative sagittal depth of the eye at the reference chord diameters.

The practitioner may then place the suggested contact lens and view the post lens tear film thickness by the use of standard sodium fluorescein. A greater connecting zone depth is required if the lens touches the central cornea excessively while a shallower depth is required if there are bubbles observed within the central zone or the connecting zone. A greater angle is required if there is excessive edge lift and a shallower angle is required in the absence of the desired edge lift.

Similarly, the depth of the lens can be increased or decreased in respective sectors of the connecting zone of the lens and the angle of respective sectors of the landing zone of the lens may be increased or decreased to provide uniform circumferential edge lift.

The foregoing disclosure is illustrative of the present invention and is not to be construed as limiting the invention. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention, and are not to be construed as limited to the specific embodiments disclosed.

We claim:

1. A contact lens having a posterior surface comprising a central zone and at least one peripheral zone, wherein:
the diameter of said lens is proportioned to extend beyond the cornea to the sclera of the eye;
a peripheral zone is defined by an angle;
said angle is formed by an intersection of a line and a cross-dimensional chord;
said line connects a hinge point at the junction of a next most central zone and said peripheral zone, and a most peripheral point of said peripheral zone, said hinge point and said most peripheral point both being located on a semi-meridian of said contact lens;
said cross-dimensional chord passes through said hinge point; and
wherein said peripheral zone is curved and convex toward the sclera of the eye.

2. A contact lens having a posterior surface comprising a central zone and at least one peripheral zone, wherein:
the diameter of said lens is proportioned to extend beyond the cornea to the sclera of the eye;
a peripheral zone is defined by an angle;
said angle is formed by an intersection of a line and a cross-dimensional chord;
said line connects a hinge point at the junction of a next most central zone and said peripheral zone, and a most peripheral point of said peripheral zone, said hinge point and said most peripheral point both being located on a semi-meridian of said contact lens;
said cross-dimensional chord passes through said hinge point;
wherein the posterior surface of said peripheral zone comprises transverse undulations; and
wherein an edge contour zone surrounds said peripheral zone, returns said contact lens to circular and planar, and is configured to be in circumferential physical contact with the sclera of the eye.

3. A contact lens having a posterior surface comprising a central zone and at least one peripheral zone, wherein:
the diameter of said lens is proportioned to extend beyond the cornea to the sclera of the eye;
a peripheral zone is defined by a first angle;
said first angle is formed by an intersection of a first line and a first cross-dimensional chord;
said first line connects a first hinge point at the junction of a next most central zone and said peripheral zone, and a first most peripheral point of said peripheral zone, said first hinge point and said first most peripheral point both being located on a first semi-meridian of said contact lens;
said first cross-dimensional chord passes through said first hinge point;
said peripheral zone is further defined by a second angle;
said second angle is formed by an intersection of a second line and a second cross-dimensional chord;
said second line connects a second hinge point at the junction of said next most central zone and said peripheral zone, and a second most peripheral point of said peripheral zone, said second hinge point and said second most peripheral point both being located on a second semi-meridian of said contact lens;
said second cross-dimensional chord passes through said second hinge point; and
wherein said first and said second angles are different such that the posterior surface of said peripheral zone comprises transverse undulations to allow said peripheral zone of said contact lens to have an equivalent lens eye relationship.

4. A contact lens in accordance with claim 3, wherein said peripheral zone is uncurved.

5. A contact lens in accordance with claim 3, wherein said peripheral zone is curved and concave toward the anterior surface of the eye.

6. A contact lens in accordance with claim 3, wherein said peripheral zone is further defined by a radius of curvature.

7. A contact lens in accordance with claim 6, wherein said radius of curvature is from about 0 mm to about 50 mm.

8. A contact lens in accordance with claim 6, wherein said radius of curvature is from about negative 20 microns to about negative 50 mm.

9. A contact lens in accordance with claim 3, further comprising a second peripheral zone, wherein:
said second peripheral zone is defined by a second angle;
said second angle is formed by an intersection of a second line and a second cross-dimensional chord;
said second line connects a second hinge point at the junction of a next most central zone and said second peripheral zone, and a second most peripheral point of said second peripheral zone, said second hinge point and said second most peripheral point both being located on a second semi-meridian of said contact lens; and
said second cross-dimensional chord passes through said second hinge point.

10. A contact lens in accordance with claim 3, wherein the central zone is spherical.

11. A contact lens in accordance with claim 3, wherein the central zone is toric.

12. A contact lens in accordance with claim 3, wherein the central zone is aspherical.

13. A contact lens in accordance with claim 3, wherein the central zone is multifocal.

14. A contact lens in accordance with claim 3, wherein the central zone is rotationally non-symmetrical.

15. A kit comprising a plurality of lenses, each of said plurality of lenses having a posterior surface comprising a central zone and at least one peripheral zone, wherein:

the diameter of each of said plurality of lens is proportioned to extend beyond the cornea to the sclera of the eye;

a peripheral zone is defined by an angle;

said angle is formed by an intersection of a line and a cross-dimensional chord;

said line connects a hinge point at the junction of a next most central zone and said peripheral zone, and a most peripheral point of said peripheral zone, said hinge point and said most peripheral point both being located on a semi-meridian of said contact lens;

said cross-dimensional chord passes through said hinge point; and wherein said peripheral zone vaults the limbus of the eye.

16. A kit comprising a plurality of lenses in accordance with claim 15, wherein each of said plurality of lenses differs from the others in at least one of a radius of said central zone, a depth of said peripheral zone, and said angle.

* * * * *